United States Patent Office 3,144,436
Patented Aug. 11, 1964

3,144,436
PROCESS FOR DEGRADING STEREOREGULAR POLYMERS
Robert Eugene Greene and Edwin Thomas Pieski, Wilmington, Del., assignors to E. I. du Pont de Nemours and Company, Wilmington, Del., a corporation of Delaware
No Drawing. Filed Jan. 4, 1961, Ser. No. 80,533
10 Claims. (Cl. 260—93.7)

The present invention relates to a process for preparing low or moderate molecular weight stereoregular polymers which are more easily processible than stereoregular polymers of very high molecular weight. It further relates to a process for converting the very high molecular weight stereoregular polymers into low or moderate molecular weight stereoregular polymers which have physical properties superior to the corresponding polymers sythesized directly to the same molecular weight.

It heretofore has been shown that terminally unsaturated hydrocarbons can be polymerized readily using coordination catalysts which consist essentially of compounds, and preferably halides, of transition elements found in Groups IIIb, IVb, Vb, and VIb of the Periodic Chart of the Elements, such as is found on pages 448–9 of the Handbook of Chemistry and Physics, 41st edition, 1959, and organometallic, metallic or metallic hydride reducing agents such as the metal alkyls, Grignard reagents, alkali and alkaline earth metals and metal hydrides. Those polymers which are produced from a monosubstituted ethylene contain asymmetric centers, and, hence, can exhibit a variety of configurations. The arrangement may be such that the asymmetric centers having the same configuration are either regularly or randomly spaced along the main polymer chain. Such materials are referred to as stereoregular and stereorandom polymers, respectively, and both types may be formed during coordination polymerization. The former type is usually characterized by its higher crystallinity, melting point, stiffness and the like, while the latter is frequently amorphous, lower melting and less rigid. When it is desirable to prepare a hydrocarbon polymer which is predominately the stereoregular type, it is preferable to use coordination catalysts of a special variety, such as those which may be formed by reacting an organometallic compound, containing at least one hydrocarbon radical bonded to the metal, with a prereduced transition metal halide of Groups IVb and Vb of the Periodic Chart of the Elements, the prereduction first being carried out using an essentially stoichiometric quantity of the organometallic to reduce the transition metal one valence below its maximum valence state. The polymers employed in the present invention, for the most part, are prepared with this special type of catalyst in order to achieve the maximum stereoregularity in the product.

Coordination catalysts which yield stereoregular polymers via the polymerization of monosubstituted ethylenes usually form these polymers in extremely high molecular weight. The high melt viscosity encountered at these very high molecular weights is detrimental to product processibility, i.e., ease of fabrication, especially in such applications as film and fiber preparation, because of the difficulty in transporting the melt through the fabrication equipment. The usual method of decreasing the melt viscosity during processing is to increase the temperature of the melt. The nature of the stereoregular polymers is such that the melting points are quite high and the polymers are thermally unstable at these temperatures so that, in practice, any attempt to decrease the melt viscosity by increasing the temperature is limited by the thermal instability of the polymer. An alternate method of achieving reduced melt viscosities, namely by deliberately conducting the coordination polymerization in such a way that the molecular weights are held at a lower level, is not satisfactory because of the inferior physical properties of these products as compared to those of the higher molecular weight materials.

The thermal instability of the high molecular weight stereoregular polymers at elevated temperatures may be exploited to achieve the desired improvement in processibility since, as a result of this instability, the polymer is reduced in molecular weight and melt viscosity. For practical applications this method usually is not satisfactory because the degradation is slow and difficult to control. Most frequently the degradation is carried out separately at from 250–450° C. in 0.5–24 hours, after which processing can be effected as desired.

Both the temperature and time required for polymer degradation may be reduced appreciably by working the polymer in the presence of oxygen. In this way the temperatures are usually reduced to the range 150–240° C. and the times, to one hour or less. In this case, however, the molecular weight and melt viscosity reduction is accompanied by the introduction of oxygen into the polymer, with the result that some of the properties of these products are unlike those of the products obtained by non-oxidative thermal crack. For example, the solubility of the oxygen containing polymer is different from one not containing oxygen, and frequently the oxidative degradation results in the formation of an appreciable grease fraction.

From the above discussion it is apparent that a need still exists for a process which will permit the conversion of very high molecular weight, difficultly processible, stereoregular polymers to low or moderate molecular weight, easily processible stereoregular polymers, at a rate which will eliminate the lengthy hold-up times and high temperatures normally employed to effect these changes and with no appreciable increase in oxygen content of the base resin. It is the object of the present invention to provide such easily processible, stereoregular polymers by converting the high molecular weight, difficultly processible, stereoregular polymers. It is a further object of this invention to carry out this process at a much lower temperature and in a much shorter time than is normally used in the standard thermal process. Another object of the invention is to effect a change in the parent polymer characteristics by a chain scission process, said chain scission occurring at points along the main polymer chain, to give new fragments of reduced molecular weight which not only retain their stereoregularity but also show essentially no increase in oxygen content. Still another object is to carry out this scission in a controlled manner so that there is essentially no grease formation, the result being that the fragments obtained are mutually compatible, thereby precluding grease exudation, and retain the same solubility characteristics as the base polymer. Another object of the invention is to provide low or moderate molecular weight stereoregular polymers which have physical properties superior to the corresponding polymers synthesized directly to the same molecular weight. A further object is to provide polymers which not only have improved processibility but better low temperature brittleness properties and higher stiffness than the base resin. A still further object of this invention is to integrate the process used with that process normally used for compaction of the product into a saleable product. Still another object of this invention is to provide obvious economic advantages which can only be realized by effecting the desired polymer changes during the finishing operation.

The objects of this invention are achieved by extruding the appropriate high molecular weight stereoregular polymer from a conventional screw type extrusion apparatus which has been modified in such a way that permits the controlled injection of a free radical initiator into the essentially oxygen-free melt zone, said initiator being carefully chosen so as to provide an adequate source of free radicals at the temperature of operation, and ideally, just at the moment when mixing is complete. The stereoregular polymers employed are those which have very high molecular weights and melt or solution viscosities, but which will be described and characterized in this invention by an inverse molecular weight relationship, namely melt index as measured by standard A.S.T.M. Test No. D-1238-57T Condition E. Those high molecular weight stereoregular hydrocarbon polymers which are particularly adapted to this invention are prepared from monosubstituted ethylenes, and in particular include those prepared from monomers containing three to ten carbon atoms such as propylene, 1-butene, 1-pentene, 1-hexene, 1-heptene, 1-octene, 1-decene, 3-methyl - 1 - butene, 3-methyl-1-pentene, 4-methyl-1-pentene, 4-methyl-1-hexene or mixtures thereof such as propylene and 1-butene, propylene and 1-pentene, propylene and 1-hexene, propylene and 3-methyl-1-butene, propylene and 4-methyl-1-pentene, 1-butene and 3-methyl-1-butene and 1-butene and 4-methyl-1-pentene and the like. As indicated hereinabove the hydrocarbon polymers may be prepared using either the conventional or the special coordination catalysts, the latter giving a higher amount of the stereoregular polymer. Where it is desirable to employ a polymer which is completely free of the stereorandom fraction, solvent extraction with an appropriate organic solvent will effect the removal of the more soluble, amorphous variety. The polymer employed in the instant case may be characterized as being at least 70% insoluble in refluxing pentane. By conducting the polymer chain scission according to the conditions which will be set forth herein below the melt index of the polymer is increased by a factor of at least two in going from the range "no flow"–10 to 0.1–100, under the conditions of the A.S.T.M. test. Where the initial melt index is "no flow" under the conditions of the standard test, the flow rate is measured at some higher temperature and with a higher load to achieve measurable flow so that in these cases the increase in melt index by a factor of two is determined at a non-standard set of conditions. Frequently, however, the treatment of "no flow" polymer results in the formation of a product whose flow then can be determined under the standard conditions. The resultant high melt index product is unusual in that it has many desirable properties not possessed by the polymer which is synthesized directly to the same melt index. Although the reason for this is not conclusively apparent, it probably is related to the catalyst activity. The co-ordination catalysts are extremely active under mild conditions and readily yield very high molecular weight products. In order to obtain low molecular weight polymers the conditions of polymerization must be changed and/or deactivators must be added, the result being that the mechanism of polymerization may be changed and a different type product may be formed. That the aforementioned difference does exist serves to emphasize the importance of the current invention which provides a method for producing polymers which are unattainable by direct synthesis. It furthermore has been noted that stereoregular polymers treated under the conditions of this invention frequently have properties, such as stiffness and low temperature brittleness, which are superior to those of the high molecular weight resin before treatment.

It appears that the free radical treatment of the polymer according to the present invention proceeds by a polymer chain scission reaction which statistically favors rupture of the longest, i.e., highest molecular weight, chains first. Since the latter contribute appreciable to the poor processibility and high melt viscosity of the parent polymer, their removal via chain scission is especially ideal since this type of reaction minimizes grease formation and low product yields, either of which may be realized from a random attack of all polymer chains independent of their length, such as in an end-group depolymerization reaction. Furthermore, the chain scission proceeds in a manner whereby essentially no oxygen is added to the polymer. In the present invention the increase in oxygen content is less than 0.2 weight percent of the total product, and usually the oxygen content of the product is about the same as that of the starting material.

According to this invention the stereoregular polymer, for example, any one of those specified hereinabove, is reacted in the essentially oxygen-free melt zone of an extruder with 50 to 5,000 parts per million of a free radical initiator. Although peroxidic compounds are generally employed, other reagents capable of generating free radicals are permissible, the important aspect in their selection being one of ensuring that the free radicals will be generated at the temperature of the polymer melt, but preferably after the free radical initiator is mixed throughout the melt so as to ensure the production of a uniform product.

The temperature employed for carrying out the reaction in the extruder is, of course, determined by the polymer melting point and the particular initiator introduced. For economic reasons the heating is preferably kept at a minimum, so that in effect, the temperature is determined principally by the melting point of the polymer. For such stereoregular polymers as poly(4-methyl-1-pentene) the minimum temperature is about 240° C., whereas for stereoregular poly(1-pentene) it is only about 75° C. and for stereoregular poly(1-butene) about 125° C., while for stereoregular polypropylene, about 165° C. Other stereoregular polymers and copolymers as specified earlier will have melting points generally in the range of the above. Upper temperatures in most cases range about 85–100° C. above the minimum temperature, but once again for economic reasons, the free radical initiator usually is chosen on the basis of its having a half life of one minute or less at about 35° C. above the minimum polymer melting temperature. Hence, there is little need to greatly exceed this latter temperature. The half-lives of just a few of the free radical initiators which may be used in the present invention are listed below:

| Free Radical Initiator | Temperature and time for $t_{1/2}$ |
| --- | --- |
| Benzoyl peroxide in benzene | 0.5 min. at 146° C. |
| t-Butyl perbenzoate in diphenyl ether | 0.5 min. at 188° C. |
| α,α'-Azobis(α-cyclopropylpropionitrile) | 1 min. at 118° C. |
| Di-t-amyl peroxide | 1 min. at 182° C. |
| Di-α-cumyl peroxide in dodecane | 1 min. at 190° C. |
| t-Butyl hydroperoxide [1] | 1 min. at 230° C. |
| α α'-Azodiisobutyronitrile | 2 min. at 132° C. |

[1] Contains 20% di-t-butyl peroxide.

In practice the free radical initiator is dissolved in a suitable solvent so that it may be conveniently injected into the melt zone of the extruder. Hydrocarbon solvents such as the alkanes, cycloalkanes or aromatics are used because they are relatively unreactive. The dilution not only affords a method of introducing the initiator but aids in distributing it throughout the polymer melt. The concentration of such solutions, in general, should not exceed 25% for reasons of safety and also to provide adequate mixing of the initiator within the melt. The amount of the initiator added is critical, primarily, only in relation to the molecular weight decrease desired, i.e., the higher the initiator concentration, the greater will be the amount of degradation. The amount also will vary somewhat depending upon the particular initiator, the temperature of operation and the polymer being degraded. In most applications the amount will vary between 0.005 and 0.5% of the total polymer weight, although it cannot be limited absolutely to these values for the aforementioned reasons. Since it is possible to vary the temperature along the length of the extruder, it is preferably to inject the free radical initiator into a zone whose temperature is below that required for its complete degradation. As the components become thoroughly mixed, the melt then passes into a hotter zone where the initiator decomposition is carried to essential completion. The reaction is considered complete after about six half-lives of the initiator, i.e., when its concentration has been reduced to about 1.5% of its initial concentration. The effect which the amount of free radical initiator has on the extent of reaction when polypropylene is treated at constant conditions according to the present invention may be seen from the following table:

TABLE I

A.S.T.M. Test Nos.:
Melt Index—D-1238-57T Condition E
Density—D-792-50
Stiffness—D-747-58T
Low Temperature Brittleness—D-746-57T

| Amount of di-α-cumyl peroxide (percent) | Melt Index | Density | Stiffness, p.s.i. | Percent Benzene Extractables | Low Temperature Brittleness, ° C. |
|---|---|---|---|---|---|
| Base resin untreated | 0.04 | 0.899 | 112,000 | 4.8 | 19 |
| 0.035 | 1.1 | 0.903 | 129,000 | 5.5 | 5 |
| 0.1 | 2.9 | 0.903 | 124,000 | 6.0 | 15 |
| 0.35 | 40.2 | 0.902 | 115,000 | 7.4 | |
| 1.0 | 175 | 0.901 | 105,000 | 11.4 | |

There is no appreciable drop-off in stiffness or increase in the amount of benzene extractables until the melt index increases by a factor of over 4,000, no deterioration in low temperature brittleness, until the melt index increases by a factor of over 75. Both of these melt index increases are in excess of the change required to effect the desired improvements in processibility indicated hereinabove.

The use of an extruder for carrying out the chain scission is particularly advantageous since the process can be performed continuously in the essential absence of oxygen at controlled temperatures with the variations in pressure, screw speed and screw design adding additional flexibility to the method. Pressure is not extremely critical and excessively high pressures are not required since the process yields a product whose melt viscosity is less than that of the parent resin. Screw speed, of course, controls the output rate, but in this invention is not critical since standard, commercial production rates can be maintained.

A particularly preferred method for carrying out the controlled chain scission consists of passing the polymer through a screw extruder wherein the mixing section is held at 165–275° C., the exact temperature depending upon which stereoregular polymer is being processed. The dilute solution of free radical initiator in hexane or benzene is injected into the extruder barrel and the desired product may be taken from the exit of the extruder through a die as a strand which can be cooled and cut into shapes convenient for subsequent processing or it may be taken from the extruder and converted directly into such forms as fibers, filaments, films and other extruded objects. It has been found that when it is desired to convert a very high molecular weight stereoregular polymer into a very low molecular weight stereoregular polymer by this process, i.e., where the ratio of melt index of the product is greater than fifty times the melt index of the parent resin, it is preferable to carry out the reaction stepwise, in two or more operations, by converting the very high molecular weight resin into a moderate molecular weight product and then recycling the latter to give the desired very low molecular weight material. Although the reason is not known, attempts to effect such a change in one step give less uniform products and a certain amount of foaming occurs.

The following examples are provided to illustrate but are not intended to limit the process.

*Example I*

Stereoregular polypropylene at least 70% insoluble in refluxing heptane and having a melt index of 0.5 is passed through a 2-inch Egan extruder having an overall length of 48 inches. The temperature is maintained at 230° C. at the point of the peroxide injection, increasing to 266° C. at the die head of the extruder. The product is extruded through a two-hole 3/16-inch die into 1/8-inch strands which are cut up into small cylinders for subsequent testing and fabrication. The initiator, a 3.8% solution of t-butyl hydroperoxide in benzene, is injected into the polymer melt at such a rate as to introduce 800 parts per million of hydroperoxide into the polymer which is being processed at the rate of 43 pounds per hour. The resultant product has a melt index of 10.

*Example II*

An unstabilized stereoregular polypropylene at least 70% insoluble in refluxing heptane and having a melt index of 0.9 is passed through the extruder described in Example I at the rate of 38 pounds per hour. The temperature is 231° C. at the injection point of a 7.5% solution of t-butyl hydroperoxide in benzene, increasing to 255° C. at the die head of the extruder. The peroxide solution is injected at a rate to give 640 parts per million hydroperoxide in the melt. The product is withdrawn from the extruder through a 0.22-inch die and the cooled 1/8-inch strand is cut into small cylinders. The melt index of the product is 18.

*Example III*

Stereoregular polypropylene at least 70% insoluble in refluxing heptane and having a melt index of 0.3 is passed through the 2-inch Egan extruder at the rate of 28 pounds per hour. A 10% solution of t-butyl hydroperoxide in benzene is injected into the polymer melt at a rate to provide 910 parts per million hydroperoxide in the polymer. The temperature at the injection point is 230° C., increasing to 252° C. at the die head. The product is withdrawn through a 0.22-inch die and the cooled 1/8-inch strand is cut into small cylinders. The melt index of this resin is 9.

*Example IV*

Example III is repeated, increasing the hydroperoxide concentration to 2,500 parts per million in the resin. The through put rate is 29 pounds per hour and the injection point and die temperatures are 230° C. and 254° C., respectively. The melt index of the product is 80, thus reflecting the effect of the increased hydroperoxide concentration.

*Example V*

Stereoregular polypropylene at least 70% insoluble in refluxing heptane and having a melt index of 1.3 is treated with sufficient 6% solution of t-butyl hydroperoxide in benzene to provide 670 parts per million of the hydroperoxide in the polymer when it is processed as in Example I but at the rate of 50 pounds per hour. The temperatures are 230° C. and 260° C., respectively, at the injection point and the die head of the extruder. The melt index of the product obtained after withdrawing from the extruder through a 0.22-inch die is 28.

*Example VI*

A product which is obtained in a manner similar to that described in Example V is passed through the extruder at a rate of 53 pounds per hour. A 10% solution of t-butyl hydroperoxide in benzene is injected at a rate to give 1,200 parts per million initiator in the melt whose temperatures are 228° C. and 255° C. at the injection point and die head, respectively. The product taken off, without foaming, has a melt index of about 105, whereas the product prepared by converting the starting material of Example V directly to 105 melt index is non-uniform and difficult to extrude because of foaming.

Example VII

Stereoregular polypropylene at least 70% insoluble in refluxing heptane and having a melt index of 0.02 is processed according to the present invention by passing it through the 2-inch extruder at the rate of 39 pounds per hour. Di-α-cumyl peroxide as a 6% solution in benzene is injected at a rate sufficient to provide 700 parts per million peroxide in the melt which is at a temperature of 203° C. at the injection point and 229° C. at the die head. The effect of screw design on pressure within the extruder may be seen from the fact that the pressure in this system is only 200 p.s.i. at the injection point but 850 p.s.i. at the die. The product is extruded through a two-hole 3/16-inch die into 1/8-inch strands which are cooled and cut into small cylinders. The melt index of this product is 0.5.

Example VIII

Stereoregular poly(1-butene) is processed by passing it through the 2-inch extruder as in Example I. The appropriate quantity of free radical initiator in hydrocarbon is injected into the melt which is at a temperature of 165° C. and 190° C. at the injection point and die head, respectively. The melt index of the product is at least twice and usually 20–25 times that of the parent resin.

Example IX

Stereoregular poly(1-pentene) is processed by passing it through the 2-inch extruder as in Example I. The appropriate quantity of free radical initiator in hydrocarbon is injected into the melt which is at a temperature of 115° C. and 140° C. at the injection point and die head, respectively. The melt index of the product is at least twice and usually 20–25 times that of the parent resin.

Example X

Stereoregular poly(3-methyl-1-butene) is processed by passing it through the 2-inch extruder as in Example I. The appropriate quantity of free radical initiator in hydrocarbon is injected into the melt which is at a temperature of 350° C. and 375° C. at the injection point and die head, respectively. The melt index of the product is at least twice and usually 20–25 times that of the parent resin.

Example XI

Stereoregular poly(4-methyl-1-pentene) is processed by passing it through the 2-inch extruder as in Example I. The appropriate quantity of free radical initiator in hydrocarbon is injected into the melt which is at a temperature of 280° C. and 305° C. at the injection point and die head, respectively. The melt index of the product is at least twice and usually 20–25 times that of the parent resin.

The products from any of the above can be isolated in the manner indicated by the examples, or by varying the type of die head, they may be extruded directly into useful articles such as films, fibers, filaments, pipe and the like. The following example is given to demonstrate the usefulness of the invention in improving the processibility of a highly stereoregular polyolefin. In coating a 24-inch width of paper with a stereoregular polypropylene at least 70% insoluble in refluxing heptane and having a melt index of 1.0 the maximum paper speed which yields a uniform coating is 75 ft./min. When this polypropylene is treated according to the invention described hereinabove to raise the melt index to 10, the coating therefrom can be applied at a paper speed of 250 ft./min., while the properties of the coating remain essentially the same as those from the untreated resin.

We claim:

1. A process for improving the processibility of high molecular weight stereoregular hydrocarbon polymers which comprises treating the said polymer melt in the essential absence of oxygen in a screw extruder, at the temperature of from the the polymer melting point to 100° C. above its melting point, with 0.005–0.5 weight percent of a free radical initiator until the melt index of the resulting stereoregular product is increased from the range "no-flow"–10 to 0.1–100, under the conditions of the A.S.T.M. Test No D–1238–57T Condition E, with the amount of oxygen introduced into the polymer during the process being less than 0.2% of its total weight.

2. A process according to claim 1 in which the stereoregular polymer to be treated is stabilized.

3. A process according to claim 1 in which the stereoregular polymer to be treated is completely free of stereorandom material as determined by its complete insolubility in refluxing heptane.

4. A process according to claim 1 in which the stereoregular polymer to be treated contains up to 30 weight percent of a fraction which is soluble in refluxing pentane.

5. A process according to claim 1 wherein the stereoregular polymer to be treated is polypropylene.

6. A process according to claim 1 wherein the stereoregular polymer to be treated is poly(1-butene).

7. A process according to claim 1 wherein the stereoregular polymer to be treated is poly(1-pentene).

8. A process according to claim 1 wherein the stereoregular polymer to be treated is poly(3-methyl-1-butene).

9. A process according to claim 1 wherein the stereoregular polymer to be treated is poly(4-methyl-1-pentene).

10. The product as produced by the process according to claim 1.

References Cited in the file of this patent

UNITED STATES PATENTS

| | | |
|---|---|---|
| 2,826,570 | Ivett | Mar. 11, 1958 |
| 2,888,424 | Precopio et al. | May 26, 1959 |
| 3,012,020 | Kirk et al. | Dec. 5, 1961 |
| 3,017,238 | Levine et al. | Jan. 16, 1962 |